United States Patent Office 2,978,698
Patented Apr. 4, 1961

2,978,698
RADAR TARGET TRACKING SYSTEM

Mortimer A. Schultz and George W. Nagel, Pittsburgh, Pa., assignors, by mesne assignments, to the United States of America as represented by the Secretary of the Navy Filed July 27, 1950, Ser. No. 176,086

13 Claims. (Cl. 343—7.3)

This application is a continuation-in-part of our application Serial No. 788,394, filed Novembr 28, 1947, now abandoned.

Our invention relates to novel combinations and parts of a target-finding and target-locking system, and it has more particular relation to a continuous-wave (CW), frequency-modulated (FM), ultra-high-frequency carrier-current or radar system, using a directional antenna or antennas for aiming a wave or beam at the target and receiving a reflected echo-wave or beam from the target.

Our invention is an improvement over the subject-matter of a Jennings application, Serial No. 788,485, filed November 28, 19547, now abandoned, and a continuation-in-part thereof, Serial No. 176,107, filed July 27, 1950, disclosing a velocity-locking CW radar-system, which will lock itself on a target, in azimuth, elevation, range, and velocity; which will track that target, giving continuous measurements of these four variables as long as the target is within the range of these variables as selected for the system. Another target will not interfere with the one being tracked, unless it has the same azimuth, elevation, range and velocity within known limits set by the system. The velocity to which we are referring is the radial or line-of-sight component of the target-velocity relative to the radar-system. Because of its fourfold locking, and novel features of its receiving-filters, such a system is difficult to jam, either accidentally or on purpose, by other near-by equipment.

The Jennings system was handicapped, in some ways, by the necessity for locking the equipment first with regard to the radial velocity of the target, while using an unmodulated CW transmission, after which the frequency-modulation was introduced, and the system was locked in, on the range of the target. Automatic locks could then be placed on the azimuth and elevation of the target.

It is an object of our present invention to provide a novel radar-system which operates on frequency-modulated transmission, from the start, automatically locking itself, first on the range, and then on the radial velocity, of the target. The target-locks, on azimuth and elevation, then followed, as in previous well-known systems.

A further object of our invention is to provide a radar system in which it is possible to check and adjust the zero-zero readings of the range-measuring devices and the velocity-measuring devices, without having any available target by which the instrument-settings could be checked. We do this by an attachment which will permit the apparatus to lock itself in, on the spurious or "dummy" target which is provided by the leak-through from the transmitter directly across to the receiving-circuit of the apparatus, without being reflected back from any target, thus producing the same effect as would be produced by a target located at a zero distance from the radar-equipment, and having a zero velocity relative to the radar-equipment. In the normal use of the apparatus, this zero-zero lockup of the target-tracking equipment must be ruled out, in order that the equipment may track a real target.

With the foregoing and other objects in view, our invention consists in the circuits, systems, apparatus, combinations, parts and methods of design and operation, hereinafter described and claimed, and illustrated in the accompanying drawing, wherein:

Figure 1:
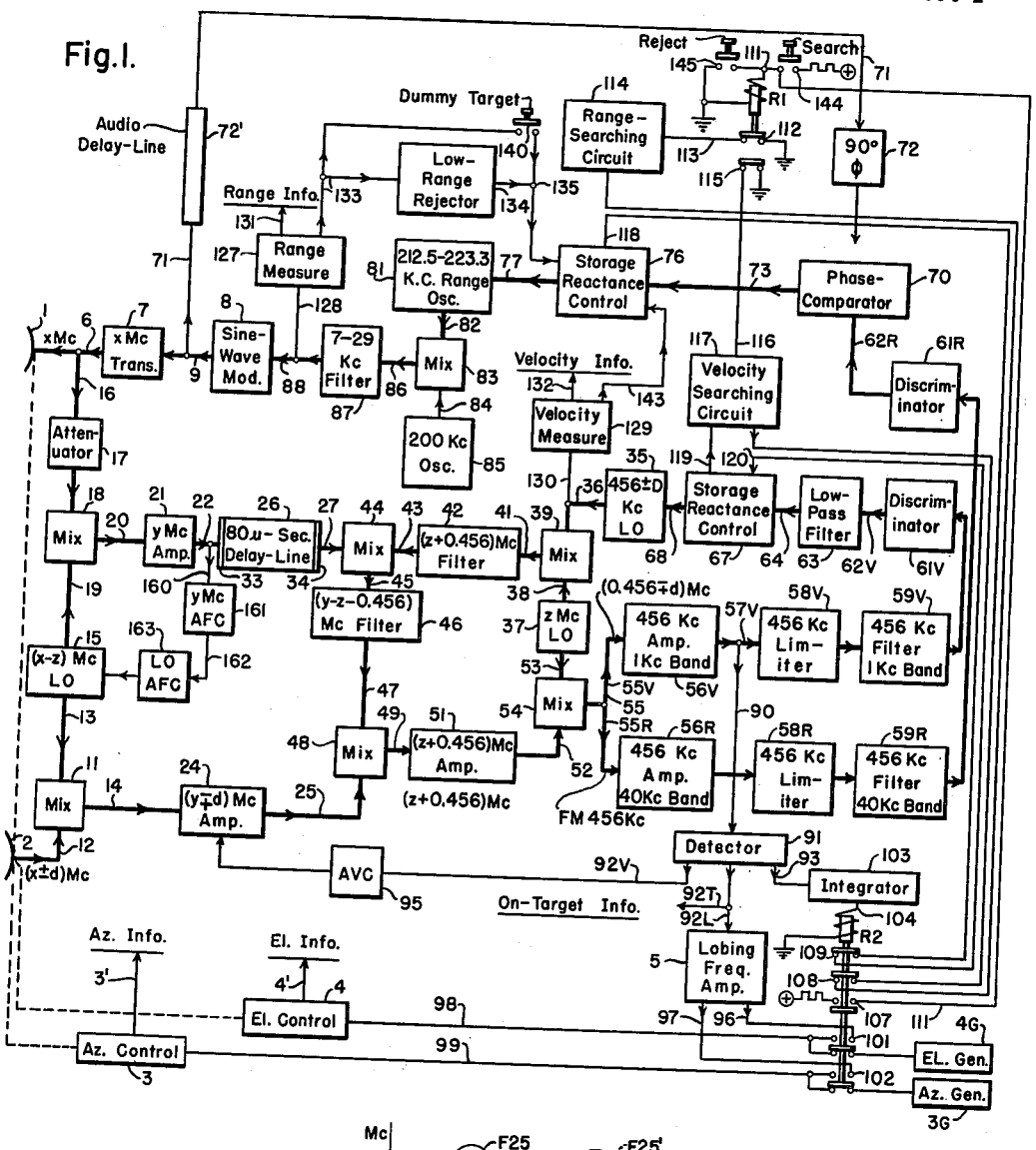
Figure 1 is a block-diagram of circuits and apparatus illustrating our invention in a preferred form of embodiment.

As shown in Fig. 1, our radar-system or apparatus uses any conventional directional antenna-system, which is illustrated, for convenience, as being of a type embodying separate transmitting and receiving antennas, as indicated at 1 and 2. This antenna-system is aimed by suitable azimuth and elevation control-devices 3 and 4, which may be either manually controlled, by means of azimuth and elevation generators 3G and 4G, respectively, or automatically controlled, as by means of a lobing-frequency servo-amplifier 5. Information as to the azimuth and elevation of the target at which the antenna-system is being aimed is obtained from the azimuth and elevation control devices 3 and 4, by circuits 3' and 4', respectively.

An ultra-high-frequency radar-wave, of $x$ megacycles (mc.), is supplied to the transmitter-antenna 1 through a transmission-line 6 which is powered by a continuous-wave transmitter 7, which is frequency-modulated (FM) by means of a modulator 8 which is connected to the transmitter by an electrical connection 9. An advantage of this invention is that the frequency-modulation may have a sinusoidal wave-shape, as distinguished from either square-topped or triangular-shaped modulating-waves such as heretofore been known, and we therefore very much prefer that the modulator 8 shall be a sine-wave modulator, because of the far greater simplicity and accuracy of means for generating a sine-wave, as compared to means for generating a wave of any other, or special, wave-shape. Our invention, however, will operate with any wave-shape of the frequency-modulating wave.

The echo-signal which is received by the receiver-antenna 2 may be heterodyned to any convenient intermediate frequency, by means of a mixer or converter or frequency-comparing demodulator 11, which receives the echo-wave through a transmission-line 12, and mixes it with a heterodyning signal which is received from a line 13 to produce a mixture of these two waves (containing both the sum and the difference of the two frequencies) in the output-line 14 of the mixer 11. The heterodyning wave of the input-line 13 is obtained from a local-oscillator (LO) 15, which may operate at a fixed frequency of $(x-y)$ mc.

At the same time, a transmitter-reference signal is obtained from the transmission line 6 of the transmitter, by means of a tapped-off transmission-line 16 and an attenuator 17, which supplies the transmitter-frequency wave to a mixer or converter 18, which heterodynes this wave with the heterodyning wave of $(x-y)$ mc., through an input-line 19 powered from the same local-oscillator 15 which is used for heterodyning the receiver-wave. The heterodyned transmitter-reference wave or feed-back wave, is obtained in the output-line 20 of the mixer or converter 18.

In the manner just described, we produce two waves, in the lines 20 and 14, from the transmitter and the receiver, respectively. The $y$ mc. part of the transmitter-reference wave is segregated, by an amplifier or filter 21, and delivered to a line 22, while the corresponding component of the receiver-wave is segregated by means of an amplifier 24, and delivered to a line 25. This segregated receiver-wave, in the line 25, has almost the same frequency as the transmitter-reference wave in the line 22, the difference being that the frequency of the receiver-wave is modified by the Doppler effect, which adds or subtracts a small frequency-increment of $d$ mc., so that the receiver-line 12 carries a frequency of $(x \mp d)$ mc., while the receiver-line 25 carries a frequency of $(y \mp d)$ mc.

If the line-of-sight or radial velocity of the target, relative to the radar-equipment, is $u$ centimeters per second, and if the frequency of the transmitted wave is $x$ mc. the Doppler frequency is $$d = \pm \tfrac{2}{3} u \times 10^{-10} \text{ mc.} \qquad (1)$$

As explained in the Jennings application, a delay-line is interposed in either the transmitter-reference line 22 or the receiver-wave line 25, so as to interpose a certain time-delay which is predetermined, depending upon the maximum range of the apparatus. In Fig. 1, a delay-line 26 is interposed between the transmitter-reference line 22 and a transmitter-reference line 27.

As further explained in the Jennings application, we may use either a fixed delay-line and a variable modulating-frequency which is applied to the sine-wave modulator 8, or a variable delay-line and a fixed modulator-frequency. In Fig. 1, the delay-line 26 is fixed, that is, it has a fixed or constant time-delay.

A delay-line may consist of a driving-crystal 33, sending supersonic impulses through a solid or liquid medium to a receiving-crystal 34, the delay-line time being the time required for the supersonic impulses to travel through the connecting medium between the two crystals.

It would be possible to directly combine the receiver-wave and the transmitter-reference wave, in a mixer or converter, and obtain, from the mixture, the difference between the two frequencies, which would be the Doppler frequency $d$, due to the line-of-sight target-velocity, plus certain range-effects which will be discussed later on. This Doppler frequency could be measured, and it would show the radial or line-of-sight velocity of the target, but it would not show whether the target were advancing or receding.

As explained in the Jennings application, however, we introduce a certain intermediate frequency into one of the incoming lines, either the received-signal line, or the transmitter-reference line. This intermediate frequency can be utilized as a Doppler-reference frequency, so that the frequency which is obtainable by mixing the two waves would be this intermediate Doppler-reference frequency, plus or minus the Doppler frequency, thereby providing a means for ascertaining whether the target is approaching or receding, and thus providing a means whereby an automatic lock can be obtained on the target-velocity.

For the purpose of providing an intermediate Doppler-reference frequency, we provide a variable-frequency local-oscillator 35, which may have any suitable frequency higher than the highest expectable Doppler frequency. A very convenient frequency for this purpose is 456 kilocycles (kc.), as suitable apparatus for operation near this particular frequency is already in general use in other equipments. We prefer to use, for the local-oscillator 35, a variable-frequency oscillator in which the frequency is variable between the limits of $(456-D)$ kc. and $(456+D)$ kc., where D kc. is the highest expectable Doppler frequency.

The 456 kc. Doppler-reference frequency could be used directly for providing a Doppler-reference frequency, but it is sometimes desirable to provide an even higher intermediate frequency for Doppler-reference purposes, so that the intermediate-frequency equipment can be tuned for this intermediate frequency, with a proper band-width, as will be subsequently described. For this purpose, in the particular apparatus which we have chosen for illustration in the drawing, we have heterodyned the output of the variable-frequency 456 kc. local-oscillator 35, as obtained in the line 36, with the output of a $z$ mc. local-oscillator 36, as obtained in the line 38, these two outputs being combined in a mixer or converter 39, having an output-line 41 which feeds an amplifier or filter 42 which is tuned to pass the sum of the two frequencies, or $(z+0.456)$ mc., delivering this frequency, through a line 43, to a mixer or converter 44.

In the particular embodiment of our invention which is shown in Fig. 1, the other input-side of the mixer or converter 44 is fed from the transmitter-reference line 27, so that a variable intermediate Doppler-reference frequency, having a mean value of $(z+0.456)$ mc., is injected into the transmitter-reference wave.

In Fig. 1, it will be noted that the mixer or converter 44 has its two input-circuits supplied from the lines 27 and 43 respectively, so as to mix the time-delayed transmitter-reference wave with the Doppler-reference wave, the mixture of these two waves being furnished by the output-line 45 of the mixer or converter 44. The difference between the $y$ mc. transmitter-reference wave and the $(z+0.456)$ mc. Doppler-reference wave is sorted out of the line 45, and passed by an amplifier or filter 46, which delivers the variable-frequency, $(y-z-0.456)$ mc., wave to the output-line 47 of the filter 46. This constitutes a new transmitter-reference wave, with the Doppler-reference frequency injected into it.

The transmitter-reference wave, of the line 47, is then mixed with the receiver-wave, of the line 25, in a mixer or converter 48, which supplies the mixture of the two waves through an output-line 49, which is connected to an amplifier or filter 51 which selects the difference between the two input-waves of the mixer or converter 48, passing a wave of the frequency $(z+0.456)$ mc. to the output-line 52 of the amplifier 51.

It is convenient, at this point, to heterodyne the wave of the line 52 with the $z$ mc. local-oscillator 37, as we have done, in the apparatus shown in Fig. 1, by supplying the $z$ mc. wave of the local-oscillator 37 through the input-line 53 of a mixer or converter 54. The other input-line of this mixer or converter is the line 52.

In the illustrated form of embodiment of our invention, the output-line 55 of the mixer or converter 54 is divided into two branch-circuits 55V and 55R. As will be subsequently explained in detail, these two branch-circuits are used respectively for the purpose of determining the target-velocity, and for the purpose of determining the target-range.

The branch output-line 55V of the mixer 54 is connected to a narrow-band 456 kc. amplifier 56V, having a 1 kc. band-width, or other band-width suitable for responding to the frequency-shifts which are brought about by the frequency-increments $d'$ which are applied to the variable-frequency Doppler-reference oscillator 35, for the purpose of ascertaining the Doppler-frequency of the target, as will be subsequently explained. The amplifier 56V has an output-line 57V, which is connected, through a limiter 58V, followed by a band-filter 59V, to supply a limited-amplitude wave to a discriminator 61V. The filter 59V has a band-width similar to that of the amplifier 56V. A discriminator is any means which has a mean-frequency response, of say 456 kc., and which produces, in its output-circuit 62V, a voltage which is positive or negative, according as the input-frequency, into the discriminator, is above or below the predetermined frequency, of say 456 kc., the magnitude of the output-voltage being more or less linearly responsive to the frequency-variation.

The discriminator-output, from the output-circuit 62V of the discriminator 61V, is fed first through a direct-current integrator, or low-pass filter, 63, which passes only the extremely low frequencies, so that it will supply a current, through its output-circuit 64, only when the system is very close to being accurately locked or in tune to the target-velocity, as will be subsequently explained. The line 64 supplies a controlling voltage to a velocity-searching variable-reactance control-device 67, which has storage-facilities, and which feeds directly, through a line 68, into the variable-frequency 456 kc. local-oscillator 35, to control the frequency thereof.

The other, or range-finding branch 55R of the output of the mixer 54, is fed through a similar line of equipment, including an amplifier 56R, a limiter 58R, a band-filter 59R, and a discriminator 61R, having an output-circuit 62R, this equipment being similar to the correspondingly numbered equipment having the V suffix, except that the R-suffixed equipment has a wider band-width, such as 40 kc. band-width, or other band-width suitable for accommodating, on each side of the mean frequency of 456 kc., the modulating-frequency of the sine-wave modulator 8, or a band-width sufficient to include enough of this frequency-range to cause the discriminator output-circuit 62R to have a voltage which follows the modulator-frequency variations in the frequency-modulated 456 kc. wave which is at times fed into the amplifier 56R through the conductor 55R, as will be subsequently explained.

The range-locking output-circuit 62R of the discriminator 61R is fed into one of the input-sides of a demodulator or phase-comparator, which is shown by a block 70. The other input-side of the phase-comparator 70 is fed from the control-line 9 of the transmitter 7, by means of a branch-circuit 71, so that the phase of the sinusoidal modulator-wave, as supplied by the modulator 8 may be compared to the phase of any residual modulator-frequency wave which exists in the discriminator-output circuit 62R, by reason of the fact that the relative magnitudes of the modulating-frequency period and the delay-line time are not properly correlated with the range-delay, or time necessary for the radar-signal to go out to, and return from, the target. Since the output of the discriminator 61R is phase-shifted 90° with respect to the transmitter-modulation, a second 90° phase-shifter 72 in interposed, in either one of the two input-circuits 71 or 62R of the phase-comparator 70, so as to balance out that phase-shift. In the particular embodiment of our invention which is illustrated in the drawing, the 90° phase-shifter 72 is interposed in series with the line 71.

In order to match the time-delay which is introduced by the delay-line 26 in the reference-wave which is obtained in conductors 45 and 47, and which is thus continued through into the input-conductor 62R of the phase-comparator 70, a similar time-delay is introduced in the other input-conductor 71 of this phase-comparator 70, as by means of an audio-frequency delay-line 72′, connected in series with the conductor 71, as shown in Fig. 1. This audio-frequency delay-line 72′ may be designed as described in "Electrical Oscillations and Electric Waves," by George W. Pierce, 1st ed., 1920, pages 298–313.

The output of the phase-comparator 70 is a direct-current voltage, which varies, in magnitude and direction, in response to the magnitude and direction of the phase-departure of the two modulator-frequency input-waves of the phase-comparator. This output voltage of the phase-comparator is supplied, through a line 73, to a range-searching automatic-frequency-control (AFC) device 76, having storage-facilities. The output of the control-device 76 is supplied, through a line 77, to a variable-frequency range-selecting oscillator 81.

The object of the range-searching AFC apparatus is to control the frequency of the sine-wave modulator 8. As will be subsequently described, the modulator-frequency varies between 12.5 kc. and 23.3 kc., in the particular apparatus which we have chosen for illustration in Fig. 1. It is more convenient, however, to have the range-control device 76 control a variable-frequency range-fixing oscillator 81 of a considerably higher frequency. As a matter of convenience, although our invention is not limited thereto, we have chosen a variable-frequency range-oscillator 81 having a frequency-range between 212.5 kc. and 223.3 kc.

The output of this range-oscillator 81 is supplied, through a line 82, to one of the input-sides of a mixer or converter 83, the other input-side of which is energized from a line 84 which is supplied by a fixed-frequency 200 kc. oscillator 85. The mixture of the frequencies of the two range-controlling oscillators 81 and 85 is supplied, by the mixer or converter 83, through a line 86 which is connected to a low-pass filter 87, which passes only the difference between the two input-frequencies of the mixer or converter 83. Thus, the filter 87 may have a band-pass width of from 7 to 29 kc., which will pass the variable ranging frequency of from 12.5 to 23.3 kc., with a comfortable margin on either side. The output of the filter 87 is connected, through a line 88, to control the frequency of the sine-wave modulator 8.

From the line 57V which carries the amplified wave resulting from a combination of the receiver-wave and the transmitter-reference wave, an auxiliary branch-connection 90 is made, leading to a detector 91, which has four output-circuits 92V, 92T, 92L and 93.

The branch 92V controls an automatic volume-control (AVC) apparatus 95 which controls the receiver-line amplifier 24. The branch 92T may be used for providing "On Target" information. The branch 92L controls the lobing-frequency amplifier 5, which has two output-circuits 96 and 97, which are used, respectively, to energize the control-input circuits 98 and 99 of the elevation-control equipment 4 and the azimuth-control equipment 3, respectively, these connections being made through two make-contacts 101 and 102 of a relay R2.

The detector-circuit 93 is connected to an integrator 103, which rejects momentary impulses, and responds to sustained impulses, to energize an output-circuit 104 only when the detector 91 remains in the detecting condition for a predeterminedly long moment of time. The output-circuit 104 of the integrator 103 energizes the operating-coil of a lock-in relay R2, which has a make-contact 107 and back-contacts 108 and 109, in addition to the make-contacts 101 and 102.

The relay-contact 107 of the relay R2 is utilized to energize an operating-circuit 111, for energizing the operating-coil of a relay R1. In the illustrated form of embodiment of our invention, said relay R1 has a back-contact 112, which normally grounds a control-circuit 113 of a range-searching circuit-device 114, so as to hold said range-searching device inoperative, or at its initial frequency-adjustment, whenever its control-circuit 113 is grounded. The relay R1 also has a back-contact 115, which normally grounds a control-circuit 116 of a velocity-searching circuit-device 117, so as to hold said velocity-searching device inoperative, or at its initial frequency-adjustment, whenever its control-circuit 116 is grounded.

The range-searching device 114 has an output-circuit 118 which is connected to the range-finding reactance-controller 76, through the back-contact 108 of the seal-in relay R2, as described in the previously mentioned Jennings application, to make said reactance-controller automatically vary the frequency of the variable frequency range-oscillator 81, during the process of searching for the correct range-frequency, corresponding to the range of the target, as will be subsequently explained.

The velocity-searching device 117 has an input-circuit 119 and an output-circuit 120, both connected to the velocity-finding reactance-controller 67, for making said reactance-controller automatically vary the velocity of the Doppler-reference oscillator 35 during the process of searching for a frequency corresponding to the radial velocity of the target, as will be subsequently explained. The output-circuit 120 serially includes the previously mentioned back-contact of the lock-in relay R2.

Two measuring-devices are provided, namely, a range-measuring device 127, which is controlled from a branch-circuit 128 leading from the conductor 88; and a velocity-measuring device 129, which is controlled from a branch-circuit 130 leading from the conductor 36. These two measuring-devices measure the range and the line-of-sight velocity of the target, as will be subsequently described. They are connected, respectively, to output circuits 131 and 132 which give "Range" information and "Velocity" information, respectively.

The range-measuring device 127 also has an output circuit 133 which is connected, through a low-range rejector 134 and a control-circuit 135 to the storage reactance-control device 76, so as to assist the automatic range-finding frequency-controlling operation of the range-searching circuit-device 114. The purpose of the low-range rejector 134 is to respond to ranges which are so small as to be confused with, or by, the leak-through from the transmitter. In the particular apparatus which we have illustrated, this barred or rejected low range includes target-ranges from zero up to ranges having a range-delay time of one microsecond or less, referring to the range-delay time which is necessary for the radar-signal to go out from the transmitter to the target, and to be reflected back again to the receiving equipment of the apparatus. The low-range rejector 134 prevents the variable-frequency range-oscillator 81 from locking up below the frequency corresponding to a range delay time of about one microsecond. In the particular apparatus which we have illustrated, this minimum frequency, which is permitted by the low-range rejector 134, is about 212.5 kc., as will be subsequently explained more in detail.

It is a feature of our invention, therefore, to use a variable-frequency range-oscillator 81 which is subject to frequency-variation down to the frequency corresponding to a target having a zero range. In the particular apparatus which is illustrated, this zero-range frequency is about 212.5 kc. With this kind of apparatus, it is possible, therefore, to provide a "Dummy Target" push-button 140, by means of which it is possible for the operator to short-circuit or bypass the low-range rejector 134, thus making it possible for the range-searching device 114 to "find" the zero-range indication which is provided by reason of the leak-through from the transmitter to the recevier.

The velocity-measuring device 129 may be provided with an output-circut 143 which "force-feeds" the range-searching reactance-controller 76 in response to the direction and magnitude of the line of sight velocity of the target. Thus, when the target is approaching the range-finding equipment, the range of the target will be continuously decreasing, and the velocity-responsive control-circuit 143 passes that information on, to the range-finding control-equipment, so as to enable it more easily to follow the varying range of the target. In like manner, the necessary information is passed on, when the target-velocity indicates a receding target, with ever-increasing range.

After a prospective target has been found by the manually controlled aim of the antenna-system 1—2, by suitable control of the azimuth and elevational generators 3G and 4G, the automatic target-following equipment can be set in operation by depressing a push-button 144 which is located at the top of Fig. 1, and which is marked "Search," to indicate that the equipment is being asked to search for the target. This searching push-button 144 serves to initially energize the control-circuit 111 which picks up the relay R1.

When it is desired to have the apparatus cease tracking a target on which it has fastened, the operator is provided with a "Reject" push-button 145, which grounds the operating-coil of the relay R1, thus causing the automatic target-tracking apparatus to lose its target, releasing the automatic tracking of that target.

In the operation of the particular apparatus which is shown in 144 Fig. 1, before the "Search" button is depressed, that is, when the apparatus is not automatically locking itself on a target, the range-searching apparatus 114 will be in its maximum-range position, being biased so that it will drift to that position when its control-circuit 113 is grounded by the relay-contact 112. At the same time, the velocity-searching apparatus 117 will be in its postion for responding to a target which is approaching at the maximum velocity to which the equipment will respond, said velocity-searching apparatus being biased so as to automatically drift into that position, when its control-circuit 116 is grounded by the relay-contact 115.

The maximum range of the apparatus is obtained when the range-frequency is the highest, as will be subsequently explained. In the particular apparatus which is illustrated in Fig. 1, this maximum-range oscillator-frequency, of the oscillator 81, is about 223.3 kc.

The maximum approach-velocity to which the apparatus will respond is obtained when the Doppler-reference frequency, of the variable-frequency 456 kc. local-oscillator 35, is the lowest. In the particular apparatus which is illustrated in Fig. 1, this minimum Doppler-reference frequency is indicated as $(456-D)$ kc.

Normally, therefore, that is, before the "Search" button 144 is depressed, the sine-wave modulator 8 is frequency-modulating the $x$ mc. frequency of the transmitter 7 at the maximum modulation-frequency of 23.3 kc. and a continuous-wave (CW) frequency-modulated (FM) radar-wave is being transmitted from the antenna 1. The range corresponding to this modulator-frequency, and corresponding to a delay-line time-delay of 80 microseconds, is higher than the longest range to which the particular illustrated apparatus will respond, so that there will be no target-finding response of the apparatus, under these conditions.

At the same time, the velocity-searching controller 117 is holding the variable Doppler-reference frequency of the local-oscillator 35 at its lowest value, corresponding to the approach-velocity of a target which is approaching the radar-equipment with relative velocity higher than any target is expected to attain, so that the equipment will not be automatically fastened onto any target-velocity.

When, now, a target is manually found, the antenna-system 1—2 being manually aimed approximately at this target, the search-button 144 is depressed, and held depressed for a moment. Instantly, the grounds are removed, by the relay R1, from the control-circuits 113 and 116 of the range-finding and velocity-finding controllers 114 and 117, respectively, and these controllers instantly apply small biasing-voltages to their respective control-equipments, so as to make the latter rapidly vary their frequencies over the ranges for which the apparatus is adjusted, each controller operating independently of the other, and at its own independent scanning-speed.

Figure 2:
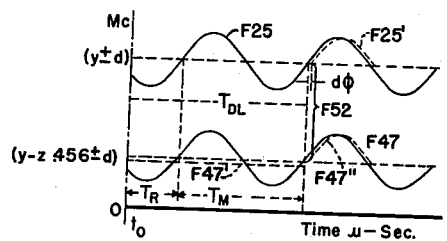
Fig. 2 is a wave-diagram which will be referred to in the explanation of the operation.

Fig. 2 shows what would happen, in an idealized case in which both the modulator-frequency, of the sine-wave modulator 8, and the Doppler-reference frequency $(0.456 \mp a')$ mc., of the local-oscillator 35, were correct, from the very first, that is, starting from the time to when the target-searching apparatus was first set in operation. The echo-wave, which appears in the receiver-circuit 25 of Fig. 1, is shown by F25 in Fig. 2. This is a frequency-modulated wave, frequency-modulated about the mean frequency to which the receiver-wave has been heterodyned. Fig. 2 plots the instantaneous frequencies against time, expressed in microseconds. The mean frequency of the receiver-wave is $y$ mc., to which is added or subtracted the Doppler-frequency of $d$ mc. Since the entire transmitted wave is bodily time-delayed, in the receiver-wave, by the range-delay time $T_R$ required for the wave to go out to the target and to come back to the receiver, the phase of the frequency-modulations, in the receiver-wave F25, will be displaced by the time $T_R$, as diagrammatically illustrated in Fig. 2.

In Fig. 2, the transmitter-reference wave, as it appears in the circuit 47, is plotted at F47. This again is a frequency-modulated wave, having a mean frequency at an intermediate-frequency value to which the transmitter-reference wave has been heterodyned. In the illustrated example, the mean frequency of the transmitter-reference wave F47 is $(y-z)$ mc., minus $(0.456 \mp d')$ mc., the latter being the frequency of the Doppler-reference local-oscillator 35. Because of the presence of the delay-line 26, in the circuit of the transmitter-reference wave F47, the relative phase of the frequency-modulation is delayed by a delay-line time-interval of $T_{DL}$ µ-sec., as diagrammatically indicated in Fig. 2.

While the full-line curves in Fig. 2 show the ideal conditions, after the tuning has been accomplished, these ideal conditions will not be realized at the first moment of searching for the target, because the modulating-frequency will be in a state of change, resulting in all kinds of phase-displacement, throughout the entire 360°, between the two waves F25 and F47, as indicated by the small portion of a modulation-frequency receiver wave indicated by dotted lines at F25'. At the same time, the Doppler-reference frequency, $(0.456 \mp d')$ mc., will be continuously varied, so as to vary the mean-frequency of the transmitter-reference wave F47 up and down, as indicated by the dotted-line mean value of F47', and the dotted-line instantaneous value of F47''.

The difference between the two waves, F25' and F47'', in Fig. 2, is indicated at F52. This represents the frequency of the wave which exists in the conductor 52 in Fig. 1. This differential frequency F52 has a mean value of $(z+0.456)$ mc.; and in the mixer 54 of Fig. 1, this mean differential frequency is heterodyned down to 456 kc. Superimposed upon this mean differential frequency, of $(z+0.456)$ mc. in the conductor 52, or 456 kc. in the conductor 55, there are two frequency-variation factors. One of these factors is the quantity $\mp(d'-d)$ mc., in which expression the Doppler-reference increment $d'$ is being constantly varied at the speed of the velocity-searching scanner 117. The second frequency-variation factor is a function of the modulation-frequency, depending upon the variable phase-displacements $d\phi$ between the sinusoidal waves F25' and F47'' in Fig. 2. This frequency-variation is varied substantially at the modulation-frequency rate, which is a very much faster frequency-variation than the relatively slow variations in the value of the factor $d'$ which varies only at the scanning-speed of the frequency-search 117.

When the apparatus first begins searching for its target, the high-frequency frequency-variation, at the modulator-frequency, strongly predominates, in the circuits 52 and 55 of Fig. 1, so that the output of the velocity-searching discriminator 61V, is a jumble or "hash" of rapidly varying plus and minus values, to which the velocity-searching reactance-control device 67 cannot respond. The frequency of these variations in the differential frequency F52, are, however, in the range for which the phase-comparator 70 is designed, so that this piece of apparatus constantly responds thereto, and constantly compares the phase of the frequency-modulation in the differential wave 52 with the phase of the modulation of the transmitted wave.

Thus, when the range-searching frequency-varying device 114 varies the frequency of the range-oscillator 81, and hence the frequency of the sine-wave modulator 8, to such a value that the phase-difference $d\phi$ is very nearly zero, in Fig. 2, that information will be communicated by the phase-comparator 70, in the form of an output-voltage in the circuit 73, which overpowers the frequency-searching bias from the control-line 118 into the reactance-controller 76, thereby causing the range-searching reactance-controller 76 to automatically lock itself onto that particular frequency of the range-oscillator 81, holding the modulation-frequency at the value of the range-oscillator frequency of the oscillator 81, minus the constant 200 kc. frequency of the oscillator 85.

As soon as the range-frequency variations in the differential wave F52 are silenced, the two sinusoidal waves, F25, and F47 or F47'', will always be substantially in phase with each other, so that their difference, F52, will have a constant value, except for the $\mp d'$ variations. Meanwhile, the velocity-searching circuit 117 has been futilely varying the Doppler-reference increment $d'$. As soon as the modulation-frequency has been properly adjusted, the output of the velocity-searching discriminator 61V will become a direct-current voltage, which is varied only at the relatively slow rate of the velocity-searcher 117, and these relatively slow variations can be responded to by the reactance-controlling circuit 67 which exercises an automatic frequency-controlling function of fixing or holding the frequency of the Doppler-reference local-oscillator 35 at the value at which the output of the discriminator 61V is substantially zero, indicating that the two factors $d'$ and $d$ cancel each other, leaving a constant F52 frequency of $(z+0.456)$ mc.

As soon as these two frequency-determining functions can be accomplished, for determining both the modulator-frequency and the frequency of the Doppler-reference oscillator 35, the detector 91 will respond, and stay responsive for longer than the barest instantaneous moment of time. This sustained response of the detector 91 will be responded to by the integrator 103, which thereupon energizes the lock-in relay R2, and establishes a "hold" circuit, at the relay-contact 107, around the "Search" button 144, so that the search-button may thereupon be released. While it has taken a great many words to describe these operations, the operation is really very quick, because of the electronic nature of the apparatus, so that, practically, there would be no noticeable time-period intervening between the initial depression of the search-button 144 and the locking of the apparatus on the target, with respect to range and velocity.

At the same time when the lock-in relay R2 picks up and by-passes the search-button 144, it also transfers the antenna-control from the manually controlled azimuth and elevational generators 3G and 4G to the automatic control which is accomplished by the lobing-frequency amplifier 5, so that thereafter the azimuth and the elevation of the antenna-system 1—2 will be automatically changed in such manner as to hold the apparatus on the target, in a manner which is well-known in the art.

In the preferred form of construction of our apparatus, as shown in Fig. 1, the actuation of the lock-in relay R2 also removes the frequency-shifting biasing potentials of the conductors 118 and 120, thus relieving the on-target frequency-locking control-circuits 73 and 64 from having to pull against the relatively weak voltage-biasing actions of said conductors 118 and 120 in the operation of the two reactance-control devices 76 and 67, respectively. This shift-potential removal is effected by the back-contacts 108 and 109 of the lock-in relay R2.

If the relative values of the delay-line time $T_{DL}$, the range-delay $T_R$, and the modulation-period $T_M$ are all correctly related to each other, the delay-line time $T_{DL}$ will be exactly equal to the sum of the range-delay $T_R$ and the modulation-period $T_M$, as shown in Fig. 2. Mathematically expressed, this relationship is as follows:

$$T_R = T_{DL} - T_M \qquad (2)$$

When this relationship holds, the sinusoidal echo-wave F25 will be exactly in phase with the sinusoidal transmitter-reference wave, F47, so that the frequency-difference, F52, between the two waves, will always remain constant at a fixed value.

If, however, there should be ever so slight a phase-difference between the two sinusoidal waves, F25 and F47 in Fig. 2, the output of the discriminator 61R will include a sinusoidal component at the modulating-frequency of the sine-wave modulator 8, and this modulation-frequency component will be compared, in the phase-comparing modulator or phase-comparator 70, with the phase of the sine-wave modulator 8, time-delayed to match the reference-wave F47' to determine whether the phase-shift is forward or backward, thus determining in which way a correction is required in order to maintain the conditions of Equation 2.

The reason for the delay-line 26 can be understood from the following considerations. If this delay-line were not present, that is, if $T_{DL}=0$, the in-phase condition of the two sinusoidal waves F25 and F47 would be obtained, not only when the modulation-period $T_M$ was exactly equal to the range-delay $T_R$, but also when the modulation-period $T_R$ was exactly equal to $2T_R$, $3T_R$ or any other integral multiple of the range-delay $T_R$. In other words, it would be impossible to ascertain an unique value of the range-delay period, and hence it would be impossible to ascertain the range of the target. Not only would there be many possible ranges, for each modulation-frequency, but there would be many modulation-frequencies for any given range. Without the delay line 26, therefore, it would be quite impossible to determine or measure the range of the target.

A significant thing about the determination of the range, is that the range to be measured will vary over extremely wide limits, involving, for example, a ratio approaching 37:0, between the maximum and minimum ranges to which the equipment must respond, whereas, if the equipment is to have only one response-condition for each range, and only one range for each response-condition, the variable factor, which measures range in the equipment, must not vary over a ratio of as much as 2:1, as otherwise there would be two or more settings of the equipment-adjustment, which would correspond to any given range, or two or more range-multiples which would correspond to any equipment-setting.

If, for example, a zero range-delay is taken as the minimum range to which the equipment will respond, (although we are not limited to this particular figure), and if the maximum range-delay which is measurable by the equipment is R microseconds, and if this maximum range-delay corresponds to a range which is longer than the operative range of the equipment, so that the equipment could not detect echo-waves from a target far enough away to have a range-delay of R microseconds, then if we can determine what range-delay time we have, between the limits of zero and R microseconds, for any given target, we can know, for a certainty, that the range cannot be twice that value or three times, as any other integral multiple thereof, because we will have accurately canvassed the field of possible ranges, out beyond the limit of sensitivity of the apparatus.

As previously intimated, the delay-line can be inserted, either in the transmitter-reference line, as shown at 28 in Fig. 1, or in the echo-wave line. In the latter case, the Time-Equation (2) will become $$T_R = T_M - T_{DL} \tag{3}$$

As previously intimated, also, the automatic control can be effected, either by varying the modulating frequency (or the modulation-period) or by varying the delay-line time.

In Equation 2, if we express this equation in microseconds, and replace the range-delay $T_R$ by (0 to R) microseconds, and if we specify that either the delay-line time $T_{DL}$ or the modulation time-period $T_M$ is constant, while the other one varies between maximum and minimum values which are so related that the maximum value is less than twice the minimum value of the variable quantity, the condition for successful operation will be obtained.

For example, if $T_{DL}$ is constant, then $T_M$ will vary between the limits of $(T_{DL}-0)$ and $(T_{DL}-R)$, while the range varies between the limits from 0 to R. If the maximum value of $T_M$ is less than twice its minimum value, in Equation 2, then $$T_{DL} < 2(T_{DL}-R) \tag{4}$$
$$\therefore T_{DL} > 2R \tag{5}$$

If, on the other hand, in Equation 2, the modulation-frequency should be constant, which means that the modulation-period $T_M$ would be constant, then delay-line time $T_{DL}$ would have to vary between the limits of $(T_m+0)$ and $(T_m+R)$, as the range-delay time varies between 0 and R microseconds. If, then, the maximum value of the delay-line time is to be less than twice its minimum value, then $$T_M + R < 2T_M \tag{6}$$
$$\therefore T_M > R \tag{7}$$

In Equation 3, a similar analysis will show that if the modulation-period $T_M$ is the variable, the delay-line time $T_{DL}$ must be greater than R, whereas, if the delay-line time $T_{DL}$ is the variable, the modulation-period $T_M$ must be greater than 2R.

The foregoing analysis will show that, if a constant delay-line is to be utilized, it will have to have a value greater than R, if the delay-line is placed in the echo-wave line; and it will have to have a considerably larger value, of at least 2R, if said delay-line is placed in the transmitter-reference line, as shown in Fig. 1. If, however, the length of the delay line is not a compelling consideration, then it may be desirable to place the delay-line in the transmitter-reference line, as is done in Fig. 1, because a practically unlimited amount of power is readily available in this line, for driving current through the delay-line, whereas the echo-wave line has such an infinitesimal amount of available power that, under the best conditions, it requires amplification almost up to the highest tolerable limit wherein the noise will begin to make the amplified signal indistinguishable. On the other hand, if the delay-line is to be varied, while the modulation-frequency is held constant, then the maximum value of the delay-line time will be more nearly equal, whether the delay-line is placed in the transmission-reference line or in the echo-wave line.

In the illustrative example of our invention shown in Fig. 1, we have chosen an adequate factor of safety, making the maximum range-delay R equal to 37 microseconds, corresponding to a range of some 6073 yards, for an equipment which has a maximum sensitivity-range of 6000 yards. In Fig. 1, we have shown a constant delay-line time of 80 microseconds, which means, according to Equation 2, that the modulation-period will have to vary between 43 and 79 microseconds, while the range-delay varies between 37 and 1 microseconds; or the modulation-period would have to vary between 43 and 80 microseconds, while the range-delay varied all of the way from 37 to zero microseconds. This means that the modulating frequency will vary between approximately 23.3 kc. and either 12.7 kc. or 12.5 kc., according as the range extends down to one microsecond (164.1 yds.), or zero. In either event, the frequency-range of the modulation-frequency is less than 2:1.

Information relative to the target is obtained by various means, in Fig. 1. The fact that the automatic control-apparatus is locked onto the target is given by the circuit 92T, which is shown as being energized from the detector 91. Information as to the line-of-sight velocity of the target, whether approaching or receding, is given by the circuit 132, which is energized from a velocity-measuring device 129 which is responsive to the frequency of the variable-frequency velocity-reference oscillator 35. Information concerning the range of the target is given by the circuit 131, which is responsive to the range-measuring device 127, which is in turn responsive to the modulating frequency. And finally, information relative to the elevation and azimuth of the target is obtained from the antenna-controlling devices 4 and 3, respectively.

The control of the frequency of the first local-oscillator 15 is effected, in the particular apparatus which is shown in Fig. 1, by tapping off, from the circuit 22, a branch-circuit 160, which supplies an automatic frequency control device 161 which is tuned to the frequency $y$ mc. The automatic frequency-control device 161 has an output-circuit 162 which controls an automatic frequency-controller 163 for the local-oscillator 15, so as to stabilize the frequency of the local-oscillator 15.

Our automatic equipment, as shown in Fig. 1, will hang onto a target, as long as that target remains within the response-limits of the equipment, in all four of the variables, namely, velocity, range, elevation and azimuth. The storage-facilities of the two reactance-control devices 67 and 76 enable these devices to momentarily retain their voltage-settings, or reactance-settings, in the event of a very brief loss of the radar-signal, so that when the signal comes on again our tracking-apparatus will be able to pick up the target again. If it should become desirable to make the equipment reject such a target, once it has fastened on to it, the "Reject" push-button 145 may be depressed, thereby short-circuiting the grounding-relay R1, causing it to ground the control-circuit 113 of the range-searching control-device 114 and the circuit 116 of the velocity-searching control-device 117, causing the equipment to lose the target.

Figure 3:
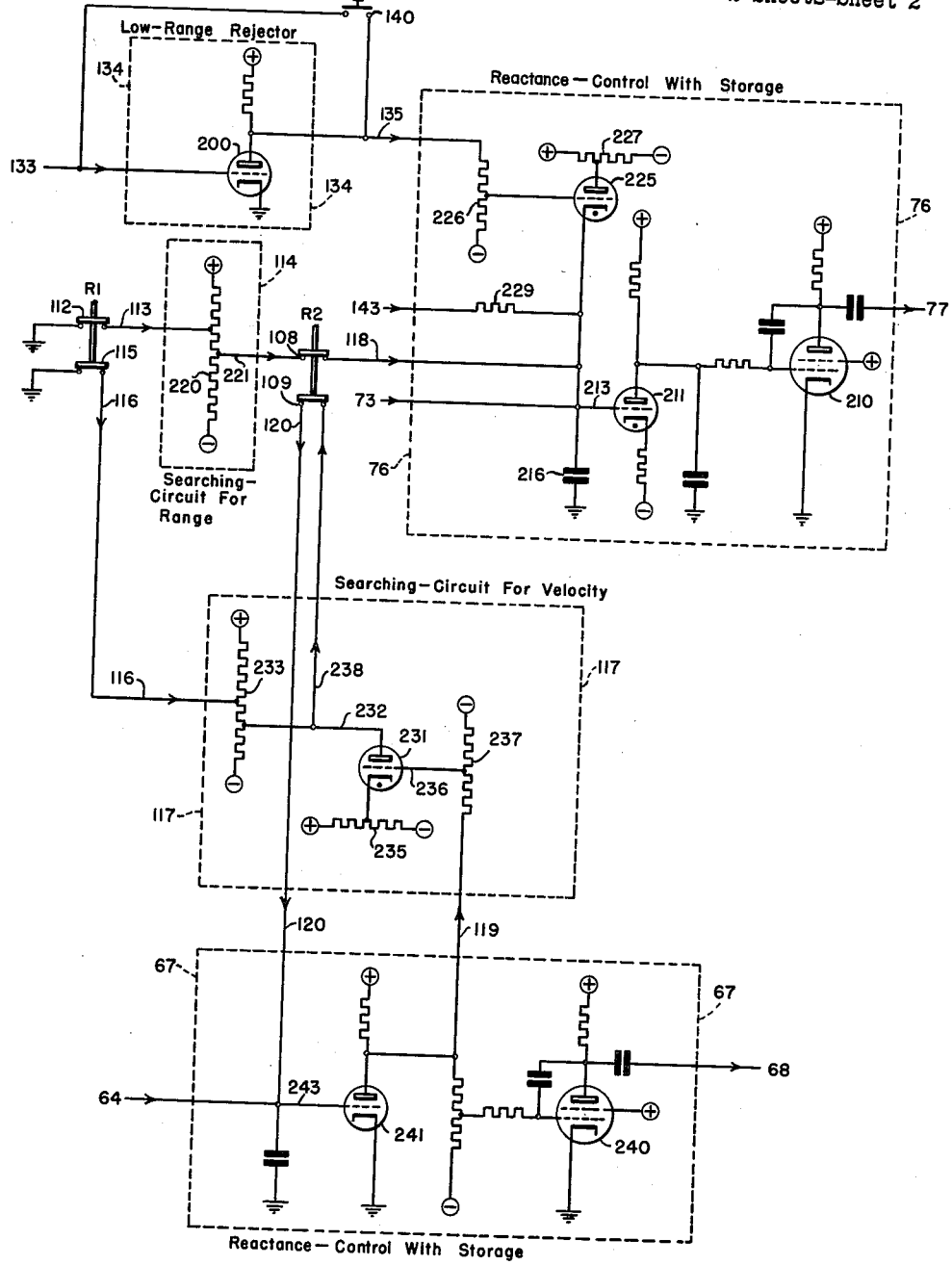
Fig. 3 is a circuit-diagram illustrative of suitable details of certain apparatus which is indicated only in block in Fig. 1.

In Fig. 3, we have shown illustrative examples of satisfactory internal details of the blocks 67, 76, 114, 117 and 134 of Fig. 1.

The low-range rejector 134 is a simple resistance-loaded triode amplifier 200, such as is shown and analyzed in many books, such as "Basic Radio," by J. B. Hoag, Van Nostrand, ©1942, pages 75-79. The input-circuit 133 of this rejector 134 is simply the grid-circuit of the triode 200. The output-circuit 135 of said rejector 134 is connected to the plate of the triode 200.

The reactance-control device 76 is essentially a reactance-tube 210, which is fed from a direct-current amplifier 211. The reactance-tube 210 is described in "Ultra-High-Frequency Techniques," by J. G. Brainerd and others, Van Nostrand, 1942, at pages 280 and 281, and the direct-current amplifier 211 is described in the same book at page 101. The output or plate-circuit of the reactance-tube 210 is used to energize the output-circuit 77 of the reactance-control device 76.

The main input-circuit 73 of this reactance-control device 76 is applied to the grid-circuit 213 of the amplifier 211, through a suitable voltage-storage or memory-device, which we have illustrated in the form of a grid-capacitor 216, which has a voltage which is dependent upon how much current has been put into it, or taken out of it, through any of its control-circuits. If the radar-signal should be momentarily lost, therefore, after the radar-system has been locked onto the target, no substantial charge will be added to, or leaked off from, the grid-capacitor 216 for a short time, and hence the reactance of the reactance-tube 210 will be held substantially constant during this interval. A more elaborate storage-circuit is described and claimed in our application Serial No. 791,004, filed December 11, 1947, for Storage Circuits, now abandoned.

The other three input-circuits 118, 135 and 143 of the reactance-control device 76 are also connected to the grid-circuit 213 of the direct-current amplifier 211. The input-circuit 118, which comes from the searching-device 114, controls the impedance-variation of the reactance-tube 210, and hence the frequency-variation, for searching for the range of the target, until the proper range-frequency has been found, at which time the main control-circuit 73 takes control, with a signal which is strong enough to overcome the frequency-varying voltage of the searching-circuit 118, so as to hold the frequency constant long enough for the target-responsive relay R2 to pick up and open its back-contact 108 in the circuit 118, thus disconnecting the searching-device 114.

The range-searching circuit 114 is, or may be, simply a potentiometer 220, to which is connected the input-circuit 113 and the output-circuit 221. The output-circuit 221 of the range-searching device 114 is connected to the reactance-controlling input-circuit 118 through the back-contact 108 of the target-responsive relay R2. The voltage-varying or searching action of the range-searching device 114 is halted when its input-circuit 113 is grounded through the back-contact 112 of the relay R1 when said relay is energized.

The low-range rejector-circuit 135, which controls the reactance-control device 76, is connected to the grid of a thyratron 225, through a potentiometer 226, in the reactance-control device 76; the plate of the thyratron 225 is energized from a potentiometer 227; and the cathode of the thyratron is connected to the grid-circuit 213 of the amplifier 211.

The input-lead 133, into the low-range rejector 134, has a voltage which is proportional to the range. At the extreme low range, the voltage on the range-responsive circuit 133 is reduced enough, in the low-range rejector 134, to let the plate or output-circuit 135 of the rejector-tube 200 go positive enough to fire the thyratron 225 in the reactance-control device 76. The said thyratron 225 practically instantaneously increases the charge, and hence the voltage, on the grid-capacitor 216, so as to recycle the grid-circuit 213 up to its maximum voltage, while at the same time increasing the cathode-voltage of the said thyratron 225 to a potential high enough to extinguish the thyratron. The principle of operation of the thyratron or gas-triode 225 is discussed in many books, such as Brainerd's book at page 184; and "Principles of Radar," published by the Massachusetts Institute of Technology (M.I.T.) Radar School, 2d ed., 1946, at pages 4-48 to 4-88.

The circuit-constants of the low-range rejector 134 are such that, when said rejector is by-passed by the "Dummy Target" pushbutton 140, the voltage of the range-responsive input-circuit 133 never gets positive enough to fire the thyratron 225, even at the maximum range. Thus, the range-searching reactance-control device 76 is permitted to search down to zero range, when the "Dummy Target" button 140 is depressed.

The fourth input or control-circuit 143 of the reactance-control device 76 is a weak circuit, its weakness being emphasized by a serially connected resistor 229. This weak control-circuit 143 causes a slow drift, or a slow tendency to drift, in the reactance of the reactance-tube 210, in response to the velocity of the target, once the target has been found. During any brief interval of signal-loss, this slow reactance-drift, and hence frequency-drift, will aid in holding the apparatus on target, depending upon the rate at which the target was last known to be approaching or receding, before the loss of the radar-signal.

The velocity-seeking searching-circuit device 117 may consist simply of a thyratron 231, having its plate-circuit 232 energized from a drift-controlling potentiometer 233. The cathode-circuit of the thyratron 231 is energized from a potentiometer 235. The main input-circuit 119, into this searching-device 117, is connected to the grid-circuit 236 of the thyratron 231, through a potentiometer 237. The output-circuit 238 of the thyratron 231 is connected from the plate-circuit 232 to the input-circuit 120 of the velocity-searching reactance-control device 67, through the back-contact 109 of the target-responsive relay R2. The velocity-searching device 117 has a second control-circuit 116, which is connected to the plate-circuit potentiometer 233 of the thyratron 231, so as to ground this potentiometer, and thus inactivate the thyratron 231, whenever the back-contact 115 is closed, in the unenergized position of the relay R1, thus holding the velocity-searching device 117 at its initial frequency-adjustment whenever its second control-circuit 116 is grounded.

The velocity-searching reactance-control device 67 is similar, in many respects, to the range-searching reactance-control device 76. It consists of a reactance-tube 240, which is controlled by a direct-current amplifier-tube 241. The grid-circuit 243 of the amplifier 241 is controlled, from the main control-circuit 64. The recycling control-circuit 120 is connected directly to the grid-circuit 243. The main output-circuit 68 of the velocity-searching reactance-control device 67 is energized from the plate of the reactance-tube 240. The auxiliary output-circuit 119, for tripping or recycling the velocity-searching device 117, is energized from the plate of the amplifer 241 of this reactance-control device 67.

While we have indicated, in Fig. 3, certain exemplary constructional and circuit-details for some of the blocks of our Fig. 1 block-diagram, we wish it to be understood that we are not limited to these details, as there are many variations which are possible. We believe that the contents of the other blocks, which are not detailed in Fig. 3, will be understood by those skilled in the art, particularly in view of the explanations which have been given.

In brief summary, it will be noted that we have provided an automatic target-finding equipment utilizing a continuous transmitted wave which is continuously frequency-modulated, and which does not need to have its frequency-modulation shut off, while the radial velocity of the target is being found and synchronized to.

We have also provided an equipment which does not ever erroneously seize onto a spurious zero-velocity indication as a result of leak-through from the transmitter, while searching for an actual target, as was the case in the Jennings equipment. In our device, the leak-through cannot normally be responded to, because of the provision of the low-range rejector 134, and the equipment is of such nature that the range is seized onto first, after which the equipment may be synchronized with respect to the radial velocity of the target, so that a zero-velocity target can be picked up, provided only that it has a range which is not rejected by the low-range rejector 134.

Our equipment is designed, moreover, so that, when the low-range rejector 134 is not effectively in operation, the range-search will be continued on through zero range, so that the apparatus will become self-excited by reason of the leak-through from the transmitter, even when there is no available target of known range and velocity by means of which the instrument-settings may be checked. For checking the instrument-settings, in regard to zero-readings of the velocity and range indicators, all that is necessary, in our equipment, is to simultaneously depress "Dummy Target" button 140 and the "Search" button 144, which causes the searching-apparatus to start into electronic operation and seize upon the leak-through from the antenna, when there is no real target within the range of the equipment in the direction at which the antenna-system may be pointing, at the moment.

While we have shown only a single illustrative form of embodiment of our invention, and while we have discussed concrete limits and figures, by way of example, we wish it to be understood that we have not limited to these details, as the invention is susceptible of considerable modification, by way of substitutions of equivalents, omissions of unwanted details, or the addition of more details, as may be needed to meet the requirements of any particular situation. We desire, therefore, that the appended claims shall be accorded the broadest construction consistent with their language.

We claim as our invention:

1. A velocity- and range-finding echo-wave device, comprising a continuous-wave transmitter-system, circuit-means for sending a continuous transmitted wave from said transmitter-system to a reflecting surface and for receiving an echo-wave from said reflecting surface, circuit-means for deriving a transmitter-reference wave from said transmitter-system, local-oscillator means for heterodyning both said echo-wave and said transmitter-reference wave, local-oscillator means for introducing a variable Doppler-reference frequency into one of the two circuits containing the respective heterodyned waves, a first controlling-means comprising a delay-means in circuit with one of the two heterodyned waves, a second controlling-means comprising a continuously operating frequency-modulator means for causing the transmitted wave of the transmitter-system to be frequency-modulated, means for mixing the two resulting heterodyned waves and for responding to the sum or difference of their frequencies, discriminator-means for responding to the frequency-variations of the resulting mixed wave above and below a predetermined mean frequency, phase-comparator means for comparing the phase of the frequency-modulations of the transmitted wave with the phase of an output of the discriminator-means, automatic range-finding control-means for so controlling one of said controlling means, in response to the output of the phase-comparator means, as to maintain a predetermined phase-relation between the modulation-frequency frequency-modulations in the two mixed heterodyned waves, automatic range-searching means for controlling said automatic range-finding control-means to search for a target-range signal between a maximum limit beyond the practical response-limit of the echo-wave device and a minimum limit greater than zero, the automatic range-finding means being operative to seize onto, and to subsequently follow, a target-range signal once found, automatic velocity-finding frequency-control means, responsive to an output of said discriminator-means, for controlling the variable Doppler-reference frequency, and automatic frequency-searching means for varying the frequency-variation of said Doppler-reference frequency from said predetermined mean frequency, the automatic velocity-finding means being operative to seize onto, and to subsequently follow, the line-of-sight velocity signal of the reflecting surface with respect to the echo-wave device, whereby the frequency-variation of said Doppler-reference frequency will be substantially equal to the Doppler-frequency.

2. The invention as defined in claim 1, in combination with range-responsive means, responsive to the automatic adjustment accomplished by said automatic range-finding control-means, for continuously giving signal information as to the range of the reflecting surface, and velocity-responsive means, responsive to the Doppler-reference frequency, for continuously giving signal information as to the line-of-sight velocity of the reflecting surface with respect to the echo-wave device.

3. The invention as defined in claim 1, characterized by said predetermined phase-relation being approximately zero, whereby the mixed wave will have substantially no modulation-frequency modulation when the automatic range-finding control-means has found the range of the reflecting surface.

4. The invention as defined in claim 1, characterized by said predetermined phase-relation being approximately zero, whereby the mixed wave will have substantially no modulation-frequency modulation when the automatic range-finding control-means has found the range of the reflecting surface, said invention being further characterized by said automatic velocity-finding means being responsive to an output of the discriminator means only after the modulation-frequency modulation has been substantially removed from the mixed wave by reason of the range-finding operation of the automatic range-finding means.

5. The invention as defined in claim 1, characterized by said discriminator means comprising a pair of discriminators, said automatic range-finding control-means being responsive to the output of one of said discriminators and said automatic velocity-finding frequency-control means being responsive to the output of the other of said discriminators, the control-circuits for the range-finding discriminator having a wider band width than the control-circuits for the velocity-finding discriminator.

6. The invention as defined in claim 1, characterized by said discriminator means comprising a pair of discriminators, said automatic range-finding control-means being responsive to the output of one of said discriminators and said automatic velocity-finding frequency-control means being responsive to the output of the other of said discriminators, the control-circuits for the range-finding discriminator having a wider band-width than the control-circuits for the velocity-finding discriminator, said invention being further characterized by said predetermined phase-relation being approximately zero, whereby the mixed wave will have substantially no modulation-frequency modulation when the automatic range-finding control-means has found the range of the reflecting surface.

7. The invention as defined in claim 1, characterized by said automatic range-finding control-means and said automatic velocity-finding frequency-control means each having its own discriminator to which it is responsive, the control-circuits for the range-finding discriminator having a wider band-width than the control-circuits for the velocity-finding discriminator, said invention being further characterized by said predetermined phase-relation being approximately zero, whereby the mixed wave will have substantially no modulation-frequency modulation when the automatic range-finding control-means has found the range of the reflecting surface, said invention being still further characterized by said automatic velocity-finding means being responsive to an output of the discriminator only after the modulation-frequency modulation has been substantially removed from the mixed wave by reason of the range-finding operation of the automatic range-finding means.

8. The invention as defined in claim 1, in combination with range-responsive means, responsive to the automatic adjustment accomplished by said automatic range-finding control-means, for continuously giving signal information as to the range of the reflecting surface, velocity-responsive means, responsive to the Doppler-reference frequency, for continuously giving signal information as to the line-of-sight velocity of the reflecting surface with respect to the echo-wave device, and "dummy-target" means for adjusting the range-finding control-means at predetermined times so as to search down to a zero indication, the velocity-finding control-means being also responsive to a zero indication, whereby these two control-means will be responsive to leak-through from the transmitter-system to the echo-wave system to provide a dummy-target zero-zero information whereby the information-giving means may be adjusted.

9. The invention as defined in claim 1, characterized by said predetermined phase-relation being approximately zero, whereby the mixed wave will have substantially no modulation-frequency modulation when the automatic range finding control-means has found the range of the reflecting surface, said invention including also range-responsive means, responsive to the automatic adjustment accomplished by said automatic range-finding control-means, for continuously giving signal information as to the range of the reflecting surface, velocity-responsive means, responsive to the Doppler-reference frequency, for continuously giving signal information as to the line-of-sight velocity of the reflecting surface with respect to the echo-wave device, and a "dummy-target" means for adjusting the range-finding control-means at predetermined times so as to search down to a zero indication, the velocity-finding control-means being also responsive to a zero indication, whereby these two control-means will be responsive to leak-through from the transmitter-system to the echo-wave system to provide a dummy-target zero-zero information whereby the information-giving means may be adjusted.

10. The invention as defined in claim 1, characterized by said predetermined phase-relation being approximately zero, whereby the mixed wave will have substantially no modulation-frequency modulation when the automatic range-finding control-means has found the range of the reflecting surface, said invention being further characterized by said automatic velocity-finding means being responsive to an output of the discriminator only after the modulation-frequency modulation has been substantially removed from the mixed wave by reason of the range-finding operation of the automatic range-finding means, said invention including also range-responsive means, responsive to the automatic adjustment accomplished by said automatic range-finding control-means, for continuously giving signal information as to the range of the reflecting surface, velocity-responsive means, responsive to the Doppler-reference frequency, for continuously giving signal information as to the line-of-sight velocity of the reflecting surface with respect to the echo-wave device, and a "dummy-target" means for adjusting the range-finding control-means at predetermined times so as to search down to a zero indication, the velocity-finding control-means being also responsive to a zero indication, whereby these two control-means will be responsive to leak-through from the transmitter-system to the echo-wave system to provide a dummy-target zero-zero information whereby the information-giving means may be adjusted.

11. The invention as defined in claim 1, characterized by said automatic range-finding control-means and said automatic velocity-finding frequency-control means each having its own discriminator to which it is responsive, the control-circuits for the range-finding discriminator having a wider band-width than the control-circuits for the velocity-finding discriminator, said invention including also range-responsive means, responsive to the automatic adjustment accomplished by said automatic range-finding control-means, for continuously giving signal information as to the range of the reflecting surface, velocity-responsive means, responsive to the Doppler-reference frequency, for continuously giving signal information as to the line-of-sight velocity of the reflecting surface with respect to the echo-wave device, and a "dummy-target" means for adjusting the range-finding control-means at predetermined times so as to search down to a zero indication, the velocity-finding control-means being also responsive to a zero indication, whereby these two control-means will be responsive to leak-through from the transmitter-system to the echo-wave system to provide a dummy-target zero-zero information whereby the information-giving means may be adjusted.

12. The invention as defined in claim 1, characterized by said automatic range-finding control-means and said automatic velocity-finding frequency-control means each having its own discriminator to which it is responsive, the control-circuits for the range-finding discriminator having a wider band-width than the control-circuits for the velocity-finding discriminator, said invention being further characterized by said predetermined phase-relation being approximately zero, whereby the mixed wave will have substantially no modulation-frequency modulation when the automatic range-finding control-means has found the range of the reflecting surface, said invention including also range-responsive means, responsive to the automatic adjustment accomplished by said automatic range-finding control-means, for continuously giving signal information as to the range of the reflecting surface, velocity-responsive means, responsive to the Doppler-reference frequency, for continuously giving signal information as to the line-of-sight velocity of the reflecting surface with respect to the echo-wave device, and a "dummy-target" means for adjusting the range-finding control-means at predetermined times so as to search down to a zero indication, the velocity-finding control-means being also responsive to a zero indication, whereby these two control-means will be responsive to leak-through from the transmitter-system to the echo-wave system to provide a dummy-target zero-zero information whereby the information-giving means may be adjusted.

13. The invention as defined in claim 1, characterized by said automatic range-finding control-means and said automatic velocity-finding frequency-control means each having its own discriminator to which it is responsive, the control-circuits for the range-finding discriminator having a wider band-width than the control-circuits for the velocity-finding discriminator, said invention being further characterized by said predetermined phase-relation being approximately zero, whereby the mixed wave will have substantially no modulation-frequency modulation when the automatic range-finding control-means has found the range of the reflecting surface, said invention being still further characterized by said automatic velocity-finding means being responsive to an output of the discriminator only after the modulation-frequency modulation has been substantially removed from the mixed wave by reason of the range-finding operation of the automatic range-finding means, said invention including also range-responsive means, responsive to the automatic adjustment accomplished by said automatic range-finding control-means, for continuously giving signal information as to the range of the reflecting surface, velocity-responsive means, responsive to the Doppler-reference frequency, for continuously giving signal information as to the line-of-sight velocity of the reflecting surface with respect to the echo-wave device, and a "dummy-target" means for adjusting the range-finding control-means at predetermined times so as to search down to a zero indication, the velocity-finding control-means being also responsive to a zero indication, whereby these two control-means will be responsive to leak-through from the transmitter-system to the echo-wave system to provide a dummy-target zero-zero information whereby the information-giving means may be adjusted.

References Cited in the file of this patent

UNITED STATES PATENTS

| | | |
|---|---|---|
| 2,409,448 | Rost | Oct. 15, 1946 |
| 2,420,264 | Rost | May 6, 1947 |
| 2,414,108 | Knowles | Jan. 14, 1947 |
| 2,424,796 | Carlson | July 29, 1947 |
| 2,433,681 | Blumlein | Dec. 30, 1947 |
| 2,444,171 | Sanders | June 29, 1948 |
| 2,491,029 | Brunn | Dec. 13, 1949 |
| 2,476,409 | Free | July 19, 1949 |
| 2,517,540 | Busignies | Aug. 8, 1950 |

FOREIGN PATENTS

| | | |
|---|---|---|
| 582,503 | Great Britain | Nov. 19, 1946 |